(12) United States Patent
Kreuter

(10) Patent No.: US 7,196,781 B2
(45) Date of Patent: Mar. 27, 2007

(54) METHOD FOR VERIFYING A PERFORATION PATTERN SERVING AS A SECURITY CHARACTERISTIC

(75) Inventor: Rüdiger Kreuter, Darmstadt (DE)

(73) Assignee: DataCard Corporation, Minnetonka, MN (US)

( * ) Notice: Subject to any disclaimer, the term of this patent is extended or adjusted under 35 U.S.C. 154(b) by 374 days.

(21) Appl. No.: 10/399,741

(22) PCT Filed: Oct. 22, 2001

(86) PCT No.: PCT/EP01/12186

§ 371 (c)(1),
(2), (4) Date: Jan. 14, 2004

(87) PCT Pub. No.: WO02/33652

PCT Pub. Date: Apr. 25, 2002

(65) Prior Publication Data

US 2005/0105774 A1    May 19, 2005

(30) Foreign Application Priority Data

Oct. 20, 2000   (DE) ................................ 100 52 184

(51) Int. Cl.
G06K 9/74         (2006.01)
(52) U.S. Cl. ...................................................... 356/71
(58) Field of Classification Search .................... None
See application file for complete search history.

(56) References Cited

U.S. PATENT DOCUMENTS 6,739,627 B2 *   5/2004   Cobben et al. ............... 283/91
6,786,513 B1 *   9/2004   Cobben et al. ............... 283/72

FOREIGN PATENT DOCUMENTS

| EP | 0 861 156 | 9/1998 |
| WO | 95/26274 | 10/1995 |
| WO | 97/18092 | 5/1997 |
| WO | 98/19869 | 5/1998 |
| WO | 00/43216 | 7/2000 |

* cited by examiner

*Primary Examiner*—Michael P. Stafira
(74) *Attorney, Agent, or Firm*—Hamre, Schumann, Mueller & Larson, P.C.

(57) ABSTRACT

A method of checking the authenticity of a perforation pattern which serves as a security feature and which when viewed in daylight back-lighting shows image information in the substrate of a document in particular in card form, wherein both the front side and also the rear side of the substrate is viewed in the region of the perforation pattern under incident light with light of a defined wavelength and in that case the image which is inherent to the perforation pattern shows on the front side while on the rear side thereof an area corresponding to the region of the perforation pattern shows up only in unspecified fashion.

15 Claims, 1 Drawing Sheet

METHOD FOR VERIFYING A PERFORATION PATTERN SERVING AS A SECURITY CHARACTERISTIC

FIELD

The invention concerns a method of checking a security feature.

BACKGROUND

It is known from WO 98/19869 to incorporate a security feature in the form of a perforation pattern into documents such as banknotes, passes, or plastic cards, for example payment cards. In that case a plurality of perforations are applied extensively in side-by-side relationship.

In that respect the attempt is made to produce an extensive two-dimensional image by control of the diameters of the perforations, that is to say the mouth openings of the perforations on one of the outward sides, or by way of the spacings between the mouth openings, that is to say the distribution of the mouth openings on the surface. In accordance with WO 00/43216 that is possible even when the arrangement involves blind holes which do not at all reach the viewing side.

In practice that method is implemented by a procedure whereby perforations are burnt in by means of laser light in mutually juxtaposed relationship from the rear side of the document, that is to say the substrate, in regular or irregular raster configurations. Accordingly the mouth openings of the perforations on that rear side are all of the same size, but not the mouth openings of the corresponding perforations on the front side.

Accordingly, by virtue of the variation in the size of the mouth openings on the front side, when viewing the front side in back-lighting, for example in daylight, it is possible to see an image with gray scales.

This image may involve digits, letters, symbols or representations for example of a face.

The differing diameters of the mouth openings on the front side are implemented by the duration for which the substrate is subjected to the action of laser light being varied in dependence on the desired diameter of the mouth opening.

Although a laser beam is very well focused, ultimately, as it increasingly burns into a substrate from the rear side, it produces a hole which is conical at least in the deepest region, due to the Gaussian distribution of the energy within the cross-section of the laser beam and at least as long as the duration of action of the laser beam is not still substantially prolonged after piercing the substrate. That conicity can be increased or attenuated by suitable optical systems arranged upstream of the point of impingement, for shaping the laser beam.

For, after piercing the substrate, the burnt passage is expanded to the full thickness of the laser beam and it is only after this has been achieved that the mouth opening on the exit side is approximately of the same size as the mouth opening on the entry side.

As this is precisely not wanted for influencing the size of the mouth openings on the exit side, that is to say the front side of the document, the through openings through the substrate are slightly conical when considered in longitudinal section.

In addition, due to the generation of heat by the laser light, the edges of the mouth openings, in particular on the exit side of the laser light, are rounded, at least insofar as the materials involved are relatively soft such as plastic materials.

By virtue of the conical shape of the holes which constitute the perforation pattern, the intended image, in contrast to the assertion in the above-mentioned patent application, can be recognized when considered in the back-lighting mode, irrespective of the side from which the substrate is viewed.

This is due to the fact that, even when viewing from the rear side, at which in fact the mouth openings are arranged regularly or irregularly in mutually juxtaposed relationship and are of the same diameter, the amount of the light passing thereto is nonetheless determined by the size of the mouth openings on the opposite side, the front side.

Accordingly therefore the intended image effect can be recognized when viewing from both sides. Such a security feature however is relatively easy to circumvent: thus for example a corresponding perforation pattern could be produced by means of a kind of sewing machine, for example by using two needles of differing thicknesses, or also by means of one and the same needle which is of a conical configuration at least in the front region, and simultaneous control of the depth of engagement of the needle.

SUMMARY

Therefore the object of the present invention is to provide a method of checking the authenticity of such a security feature.

For checking the security feature in general the first security step involves light checking by means of daylight.

The—optionally additional—checking of the perforation pattern in an incident light mode with light of a defined wavelength, for example UV-light, means that a completely different image effect can be detected on the front side and the rear side, with only a very simple aid, for example a UV-lamp:

While the desired image effect can be clearly recognized on the front side, insofar as the overall reflecting surface of the perforation pattern or blind hole pattern reflects to a differing degree, according to the gray scales of the image, from the rear side only a surface which reflects to a uniform degree is to be recognized, over the region of the perforation pattern.

That effect cannot be achieved with bored perforations.

This differing degree of reflection is due to interference of the UV-light used, caused by reflection phenomena in particular in the edge region of the mouth openings and in the peripheral region at the beginning of the through openings of the perforation pattern.

If however incident light viewing is to be implemented directly by means of a light of a defined wavelength as the first checking operation, it is recommended that transillumination by means of daylight be additionally implemented from both sides of the document as an enhanced level of security can be achieved by the combination of the two checking procedures.

In both cases viewing was effected with the naked eye so that no aids are required for that purpose, besides shining on the light of a defined wavelength, that is to say for example UV-light.

BRIEF DESCRIPTION OF THE DRAWINGS

An embodiment according to the invention is described in greater detail hereinafter by way of example with reference to the Figures in which.

DETAILED DESCRIPTION

Figure 1:
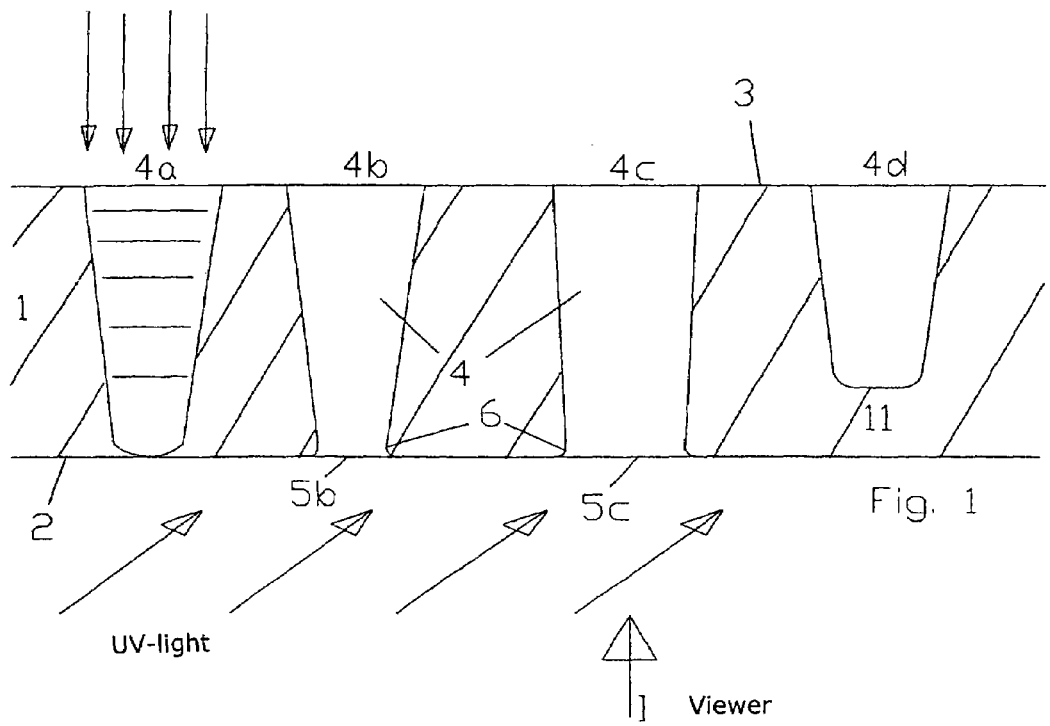
FIG. 1 is a cross-sectional view through the substrate.

FIG. 1 shows a cross-section through the substrate 1, more specifically along the longitudinal axes of the holes 4a, b, c . . . , thereof, which form the perforation 4.

The holes 4 are all introduced into the substrate 1 from the upwardly disposed rear side 3. In that respect the hole 4a shows how, with a progressive time of exposure by virtue of a laser beam, the result produced is a blind hole which is of a conical configuration at least in its respective deepest region, by virtue of distribution of the energy within the laser beam.

In a corresponding manner, when piercing a front side 2 which is in opposite relationship to the rear side 3, the mouth opening on that exit side is substantially smaller in diameter than on the entry side.

As the hole 4b which passes completely through the substrate 1 shows it is possible in that way to produce through holes whose mouth opening, for example 5b, on the exit side thereof, is definedly smaller than on the entry side of the hole.

If, after the exit side, that is to say the front side 2, has been pierced in that way, as has just been effected, the action of the laser light is continued for a longer period of time, in that way the mouth opening on the exit side is enlarged more and more until—as shown in the case of the hole 4c—on the exit side it is of a diameter which is practically identical to the diameter of the mouth opening on the entry side.

The Figure shows, by reference to the hole 4d, that in the same way, but only with a reduced period of action of the laser light, in comparison with the structure involved with the hole for example 4b, that is to say until piercing of the oppositely disposed exit side thereof, it is also possible to produce blind holes.

In this case the bottom of that blind hole 4d is of an again markedly smaller cross-section than the mouth opening at the entry side of the hole 4d.

FIG. 1 further shows how, when that front side 2 is illuminated with UV-light 9, the angle of impingement of which can be substantially freely selected, but which preferably should be at an angle relative to the front side 2 of more than 10°, preferably more than 40°, the light is reflected and also diffusely scattered, in particular at the edges 6 of the mouth openings 5 but also at the inside peripheral walls of the holes 4, in the region near the mouth openings.

Accordingly, when viewing that front side 2 during illumination with UV-light 9, a viewer perceives each mouth opening 5b, c as a light spot 7a, b whose diameter corresponds to the diameter of the respective mouth opening.

In that situation the light spot 7 appears as shining over its entire area although the mouth opening 5 represents a ring. The diameter of the light spot is in particular slightly larger than the diameter of the respective mouth opening, which is to be attributed to diffuse radiation of the UV-light in particular in the regions of the edge 6.

Figure 2:
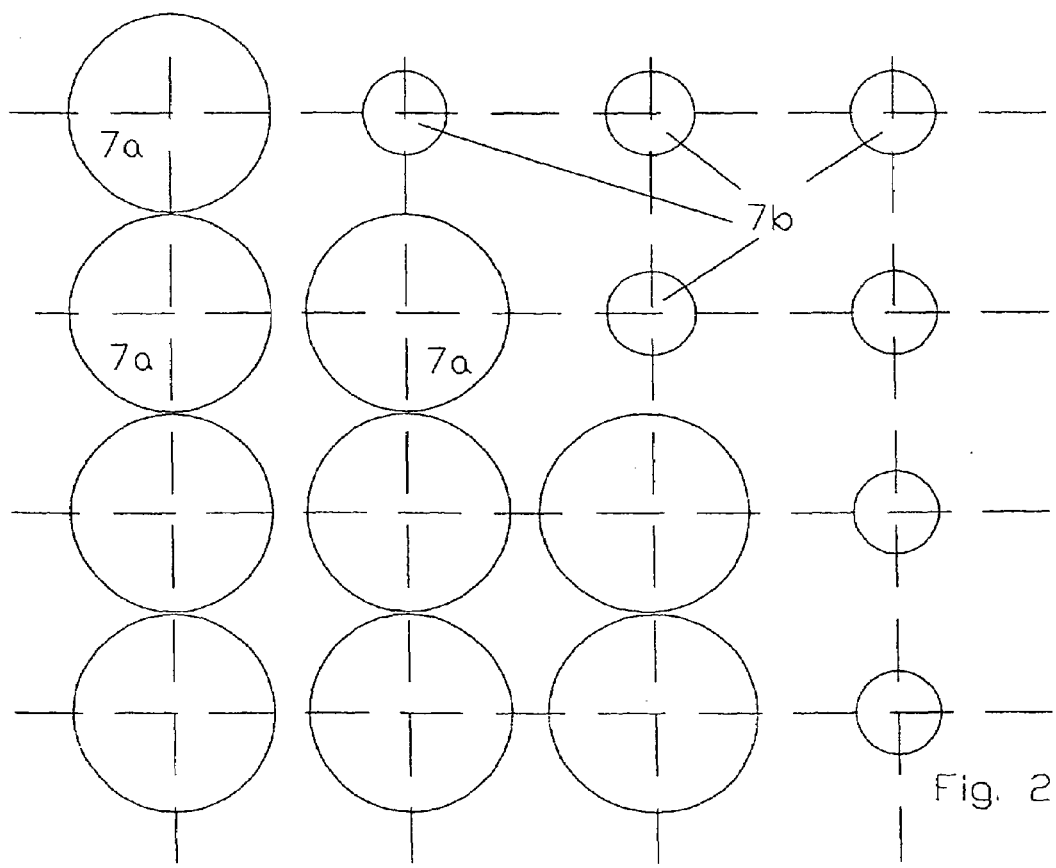
FIG. 2 is a plan view onto the substrate illuminated with UV-light.

As FIG. 2 shows, surface-like light spots which are arranged generally regularly along a raster grid 8 but which are also irregularly distributed can produce surface effects insofar as such surfaces which have a higher proportion of shining surfaces than other surfaces are in contrast to those other surfaces.

In the case of light spots arranged along a regular raster grid 8 for example that effect is produced by brightly shining surfaces being produced by virtue of the arrangement of large light spots on the intersections of the raster grid 8.

When smaller light spots 7b are arranged on the intersection points of the raster grid 8 the surface covered in that way shines less brightly. In that way just two mouth openings 5b, 5c of differing sizes and thus light spots 7a, b of differing sizes already make it possible to produce images whose contrast corresponds to that of a black-and-white photograph.

As the sizes of the mouth openings can be varied in more than two stages, it is also possible to provide gray scale representations.

In addition it is also possible for blind holes like the hole 4b which do not penetrate the substrate as far as the front side 2 which is being viewed nonetheless to be made visible by means of UV-light insofar as the remaining residual thickness 11 is sufficiently thin to be penetrated by the UV-light.

The invention claimed is:

1. A method of checking a perforation pattern which serves as a security feature and which when viewed in daylight back-lighting shows image information in the substrate of a document in particular in card form, comprising:
   viewing both the front side and also the rear side of the substrate in the region of the perforation pattern under incident light with light of a defined wavelength and
   in that case the image which is inherent to the perforation pattern shows on the front side while
   on the rear side thereof an area corresponding to the region of the perforation pattern shows up only in unspecified fashion.

2. A method as set forth in claim 1, wherein viewing in daylight back-lighting is effected both from the front side and also from the rear side of the substrate and the image information must be visible in both cases.

3. A method as set forth in claim 1, wherein viewing is effected both in daylight back-lighting and/or under incident light with light of a defined wavelength with the naked eye.

4. A method as set forth in claim 1, wherein the wavelength of the incident light is between 10 nm and 500 nm, in particular between 100 nm and 400 nm and is in particular wide-band UV-light.

5. A method as set forth in claim 1, wherein on the rear side the mouth openings of the perforation pattern are all of equal size and in particular are arranged in regular relationship with each other, but on the front side the mouth openings are of different sizes.

6. A method as set forth in claim 1, wherein the diameters of the mouth openings on the front side are between 20 μm and 140 μm.

7. A method as set forth in claim 1, wherein the perforations were burnt in by means of laser light.

8. A method as set forth in claim 1, wherein the substrate is a plastic material, in particular a thermosetting plastic material, in particular polycarbonate.

9. A method as set forth in claim 1, wherein the thickness of the substrate is between 0.1 and 1.0 millimeter.

10. A method as set forth in claim 1, wherein the wavelength of a laser light used for burning in the perforations is between 6 µm and 12 µm.

11. A method as set forth in claim 1, wherein the diameters of the mouth openings on the front side are between 100 times and 500 times the wavelength of the incident light used.

12. A method as set forth in claim 1, wherein the thickness of the substrate is at least 300 thousand times the wavelength of the incident light used.

13. A method as set forth in claim 1, wherein the wavelength of a laser light used for burning in the perforations is between 10 times and 70 times, in particular between 20 times and 40 times, the wavelength of the incident light used.

14. A method of checking a perforation pattern that serves as a security feature, comprising:

a first checking operation including viewing both a front side and a rear side of a substrate of a document in the region of the perforation pattern against daylight; and a second checking operation including viewing both the front side and the rear side of the substrate in the region of the perforation pattern under incident light of a defined wavelength, wherein an image that is inherent to the perforation pattern shows on the front side, while on the rear side thereof an area corresponding to the region of the perforation pattern shows up only in an unspecified fashion.

15. The method of claim 14, wherein the incident light of a defined wavelength is UV light.

* * * * *